Dec. 17, 1957 L. L. THRALL ET AL 2,816,705

COMPUTING DEVICE

Filed Jan. 15, 1954 7 Sheets-Sheet 1

INVENTORS
LEWIS L. THRALL
JOSEPH ALLAN BEEK, JR.
BY Strauch, Nolan + Diggins
ATTORNEYS Dec. 17, 1957 L. L. THRALL ET AL 2,816,705

COMPUTING DEVICE

Filed Jan. 15, 1954 7 Sheets-Sheet 2

INVENTORS
LEWIS L. THRALL
JOSEPH ALLAN BEEK, JR.

BY Strauch, Nolan & Diggins
ATTORNEYS

INVENTORS
LEWIS L. THRALL
JOSEPH ALLAN BEEK, JR.
BY Strauch, Nolan & Diggins
ATTORNEYS INVENTORS
LEWIS L. THRALL
JOSEPH ALLAN BEEK, JR.
BY Strauch, Nolan & Diggins
ATTORNEYS

COMPUTING DEVICE

Filed Jan. 15, 1954 7 Sheets-Sheet 5

INVENTORS
LEWIS L. THRALL
JOSEPH ALLAN BEEK, JR.
BY Strauch, Nolan & Diggins
ATTORNEYS INVENTORS
LEWIS L. THRALL
JOSEPH ALLAN BEEK, JR.
BY Strauch, Nolan & Diggins
ATTORNEYS Dec. 17, 1957 L. L. THRALL ET AL 2,816,705

COMPUTING DEVICE

Filed Jan. 15, 1954 7 Sheets-Sheet 7

INVENTORS
LEWIS L. THRALL
JOSEPH ALLAN BEEK, JR.
BY Strauch, Nolan & Diggins
TTORNEYS

United States Patent Office 2,816,705

Patented Dec. 17, 1957

2,816,705

COMPUTING DEVICE

Lewis L. Thrall, Inglewood, and Joseph Allan Beek, Jr., Palos Verdes, Calif., assignors, by mesne assignments, to Alwac International, Bahamas, British West Indies, a corporation of Bahamas Application January 15, 1954, Serial No. 404,226

15 Claims. (Cl. 235—61)

The present invention relates to calculating devices and more particularly to improvements in devices for producing signals indicative of the functional relationship of one variable in relation to a second variable.

Heretofore, it has been customary in the computing art when it is necessary to generate signals indicative of the functional relationship between two variables, to initially generate such signals in analogue form and, if required for use in a digital computer, to provide a translating device for converting an electrical analogue signal to an electrical digital signal.

It is the fundamental object of the present invention to provide a computing device which is operative to produce directly in digital form signals indicative of the functional relation between a pair of functionally related variables.

More specifically, it is an object of this invention to provide a computing device operative under the control of a plotted curve indicative of the functional relation of one variable to a second variable to produce in digital form signals indicative of the functional relation between such variables as defined by such curve.

Still more specifically, it is an object of the present invention to provide a computing device operative under the control of a plotted curve indicative of the functional relation of one variable to a second variable to produce in digital form a signal indicative of the change of one of such variables corresponding to each unitary change in value of the other variable.

These and other objects of this invention will become more fully apparent as the following detailed description proceeds in reference to the accompanying drawings wherein.

Figure 1:
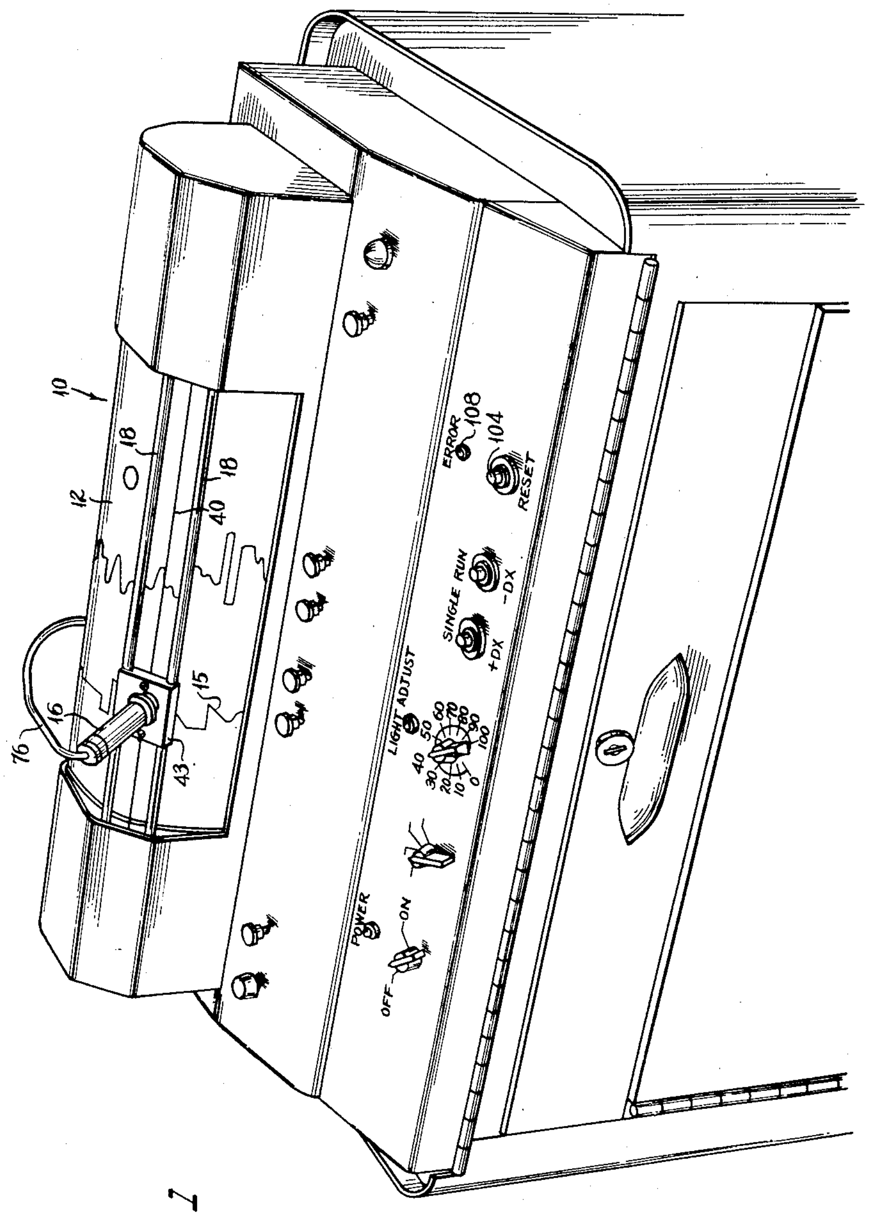
Figure 1 is a perspective view of the overall assembly of the computing device of the present invention.
Figures 2, 3, 4, 5, 6:
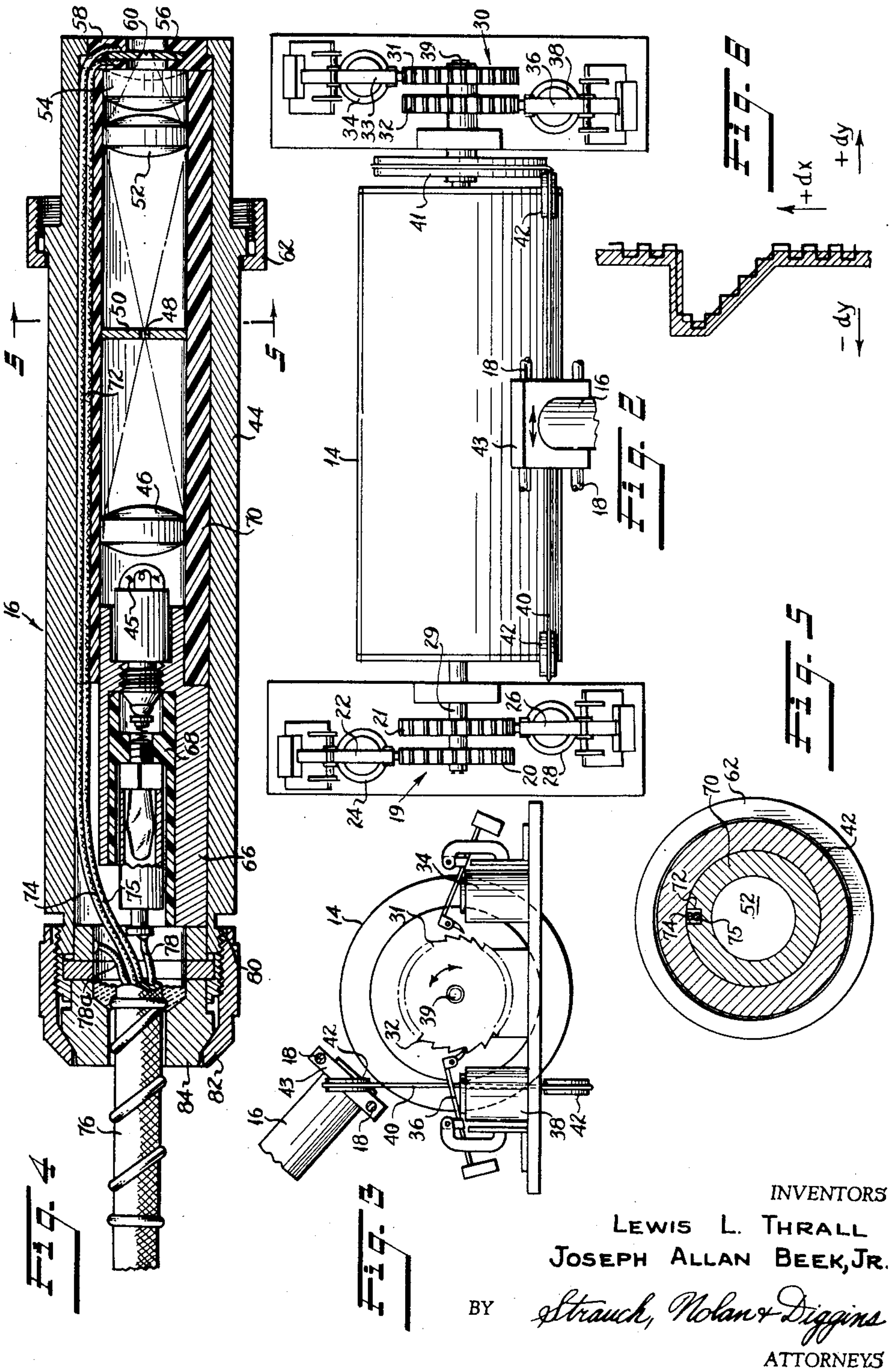
Figure 2 is a diagrammatic plan view illustrating the mechanical mechanism of the computer.
Figure 3 is a diagrammatic view constituting a right end view of the mechanism of Figure 2.
Figure 4 is a longitudinal section through the light gun structure of the mechanical curve following mechanism of the computer.
Figure 5 is a diagrammatic section through the light gun of Figure 4 taken substantially along the line 5—5 thereof.
Figure 6 is a diagrammatic illustration of the manner in which the curve following mechanism of the computer actually follows a curve.

In Figures 1 and 2, there is shown a curve follower or scanner 10, in which a sheet of paper 12 or other suitable medium, placed upon the periphery of a cylindrical rotatable drum 14 and having at least one curve 15 thereon is progressively scanned by a photosensitive light gun 16 mounted for movement longitudinally of drum 14 upon guide rods 18. The relative movement between the drum 14 and the light gun produced by rotation of the drum 14 will be referred to hereinafter as the "X" direction and that produced by movement of gun 16 along rods 18, the "Y" direction.

Means are provided to impart rotary movement to the drum 14 in equal small steps in a counterclockwise direction as viewed in Figure 3 to indicate plus delta X and in a clockwise direction to indicate minus delta X. These movements are produced in response to electrical impulses from a source of impulses, described hereinafter. Means are provided to move the light gun 16 in small equal steps along rods 18 in response to electrical impulses to the left as viewed in Figures 1 and 2 to indicate minus delta Y and to the right to indicate plus delta Y. The gun 16, in effect, "reads out" the change in value of Y at a point on the curve following each discrete unitary step of the drum 14 in the X direction so that the ratio of $dy/dx$, the slop of the curve, at each point is obtainable.

It is a familiar operation in calculus to determine the slope of a curve by making a plus or minus unit step delta X, in the X direction and then determine the length of delta Y, the change in Y corresponding to that unit of delta X on the curve. As will be explained more in detail hereinafter, the follower 10, is in combination with impulse producing means, a means operative to produce a signal indicative of the value of $dy$ for each unit step $dx$. This signal is in the form of a discrete number of pulses and, as such, can be utilized directly or counted and converted into a desired system of enumeration for use as a digital input to a digital computer.

The means for producing the delta X movement of the drum 14 are best shown in Figure 2. A wheel 19 comprising oppositely directed ratchet toothed surfaces 20 and 21 engageable respectively by pawl 22, actuated by an electromagnet 24 and by a pawl 26, actuated by an electromagnet 28 is fixed to a coaxial shaft extension 29 of drum 14. Actuation of pawl 22 produces $-dx$ movement and of pawl 26 produces $+dx$ movement.

The delta Y movement of the light gun 16 along rods 18 is produced by a wheel 30 having oppositely directed ratchet toothed sufraces 31 and 32 and actuable respectively by a pawl 33 driven by an electromagnet 34, and by a pawl 36 driven by an electromagnet 38. Wheel 30 is rotatably received upon a coaxially extending shaft 39 fixed to drum 14 at its right end as viewed in Figure 2.

A cord 40 wound about the periphery of a wheel 41 and extending in a rectangular loop over four spaced guide rollers 42 is connected to the opposite sides of the slidable mount 43 for the gun 16. Wheel 41 is fixed for rotation with wheel 30 and frictionally drives cord 40 to effect movement of the gun 16 lengthwise of the drum 14 by sliding mount 43 along rods 18.

The light gun 16 (Figures 4 and 5) comprises an elongated tubular metal casing 44, in which there is an electric lamp 45, to project light through a convex-convex lens 46, and then through a small aperture 48, in a plate 50, to pass through a convex-convex lens 52 and then through a convex-concave lens 54. A flat disk shaped photosensitive cell 56 is supported at the end of the casing 44 by a suitable apertured plastic plate 58 into which it is preferably molded. The beam of light emerging through the lens 54 passes through a bevelled aperture 60, defined by forwardly converging surfaces, in the cell 56. Coupling means 62 are provided on the casing 42 for securing the light gun 16 on a threaded stub on the carrier 43. The cell 56 is a selenium cell having both photo conductive and photo voltaic properties.

The lenses 46, 52 and 54 and the plate 50 are suitably held in spaced relation in a longitudinally extending tubular member 70, which is provided with a longitudinally extending external groove 72 through which wires 74 and 75 extend from the cell 56 to a cable 76. Cable 76, which also contains wire 78 and 78*a* connected respectively to the lamp 45 and the casing as a ground, is provided at its opposite end with a conventional terminal plug. The lamp 44 is suitably held in a recessed electrically conductive filler member 66 connected electrically to lead 78*a*. Member 66 carries recessed removable member 68 formed of an electrical insulator in which suitable contact elements 69 between the lamp and lead 78 are placed. Filler member 66 which abuts tubular member 70 and is removable therewith, is held in assembled relation with member 70 in casing 44 by a plug 84 received in an annular shell 82 which threadedly engages the casing 44 at threads 80.

The light from lamp 45 is suitably focused by the lenses 46, 52 and 54 through the bevelled aperture in the cell 56 to produce a pin point of light on the drum that is in a spot .01" in diameter at a distance of approximately .130" for the adjacent surface of cell 58. When this beam is focused on a dark line of a curve being scanned very little light is reflected back to the cell and its output voltage is low. When it leaves the line, the light reflected by the paper, which is preferably white or an otherwise highly reflective surface, is high and the output voltage of the cell is high.

Before proceeding with the detailed description of the circuitry of this device, a general description of the operation and input and output signals will be given.

In Figure 6, the shaded area represents in greatly enlarged form the thickness of the line of a curve which the device of this invention can follow. As has been pointed out, this device is effective to scan a curve in a step by step manner and to produce a signal in the form of a series of impulses indicative of the change in one variable corresponding to a unitary change in a second variable which has been plotted against the first variable in rectangular coordinates.

The manner in which the device follows the edge of a curve is as follows: If the beam of light from the light gun (Figure 4) is focused upon the white area adjacent the line of the curve to be followed, the light gun is moved step by step toward the line until it finally steps to a position in which the light beam is focused upon the dark area of the line of the curve. The drum is then advanced one step to provide a unit increment in the X direction. After this unitary X movement, the light gun is stepped in the direction required to shift the focused light beam to the condition, white or black, opposite to that on which it is focused at the completion of the unitary X step. For example, with the light beam focused at the initial point on its trace indicated at the bottom of Figure 6, the light gun will take one step to the left to effect change of its point of focus from white to black. The drum will be advanced one step and the light gun will be moved one step to the right when its point of focus will change from black to white. A *dx* step of the drum will then follow. This alternation of left and right steps of the gun in the Y direction interspersed by unitary steps in the X direction will continue so long as the gun is following a straight line extending in the X direction.

When the gun reaches the sloped portion of the curve, which in the exemplary curve is a straight line at forty-five degrees to the left of the X axis, all of the Y steps will be to the left, an X step occuring between each pair of Y steps.

When the light gun reaches the portion of the curve which is a straight line to the right in the Y direction, the light gun will be moved a number of steps in the Y direction until a change of point of focus from black to white occurs.

While a curve consisting of joined straight line segments has been shown for simplicity of illustration, this curve follower is operative, as will become apparent as the detailed description proceeds, to follow accurately any continuous curve plotted on rectangular coordinates so long as the curve is of a type in which only one of the two variables has plural values of the other variable corresponding to any given value of such one variable.

As the light gun is caused to follow the given curve, the computing device is operative to produce impulses proportional in number to the number of steps of movement of the light gun and distinguishable in accordance with the direction of light gun movement to thus provide a digital indication of the positive or negative changes of one variable, Y, corresponding to each successive unitary change of the other variable, X.

Figures 7, 10, 11:
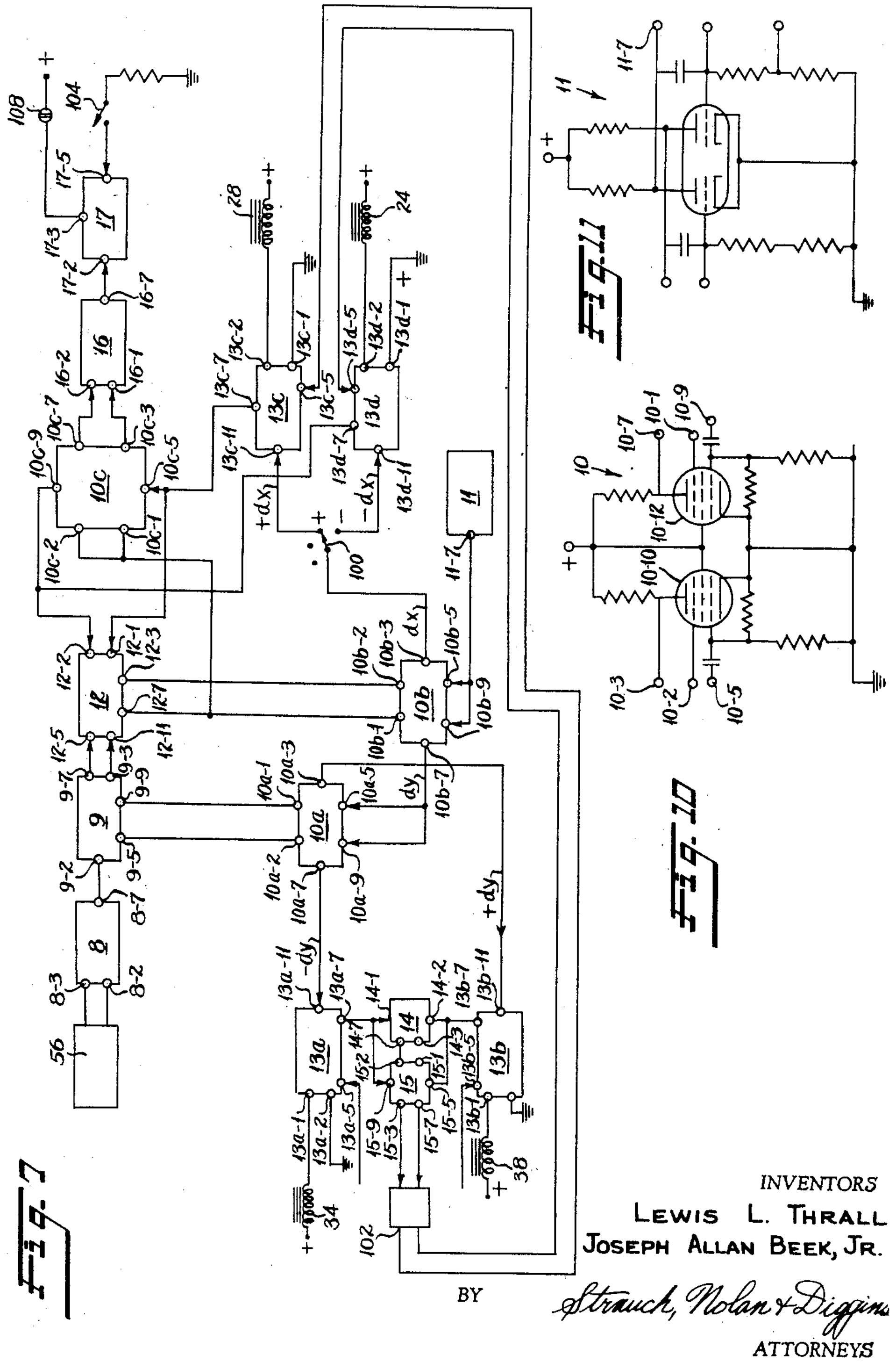
Figure 7 is a block diagram of the electrical circuitry of the computer.
Figure 10 is a schematic circuit diagram of a dual gate circuit.
Figure 11 is a schematic circuit diagram of a free running multivibrator.
Figure 8:
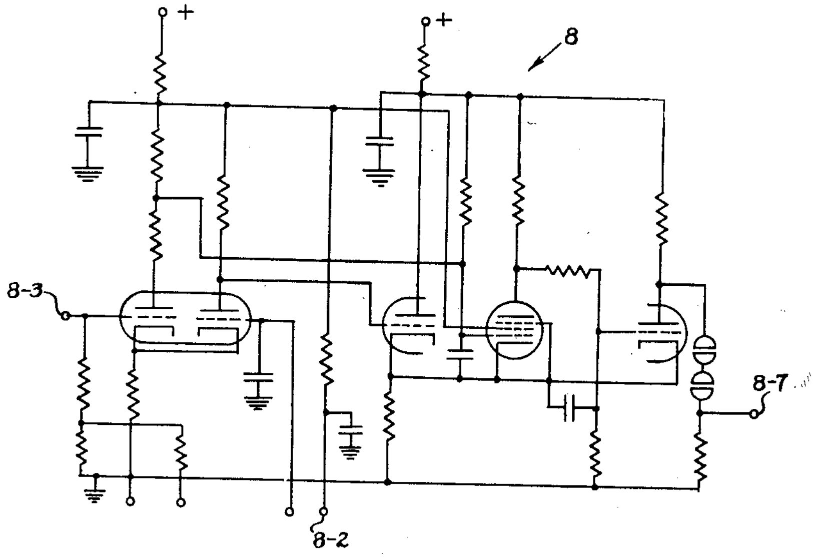
Figure 8 is a schematic electrical diagram of a photocell amplifier.
Figure 9:
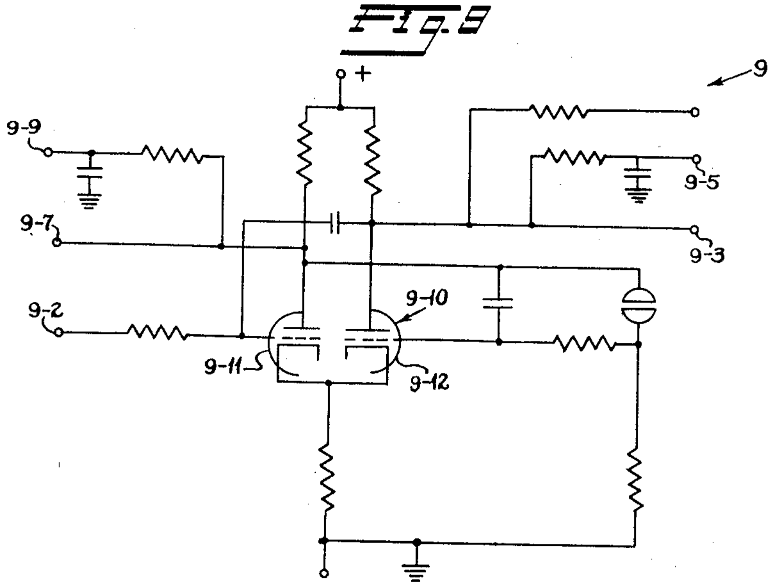
Figure 9 is a schematic electrical diagram of a Schmidt trigger.
Figure 12:
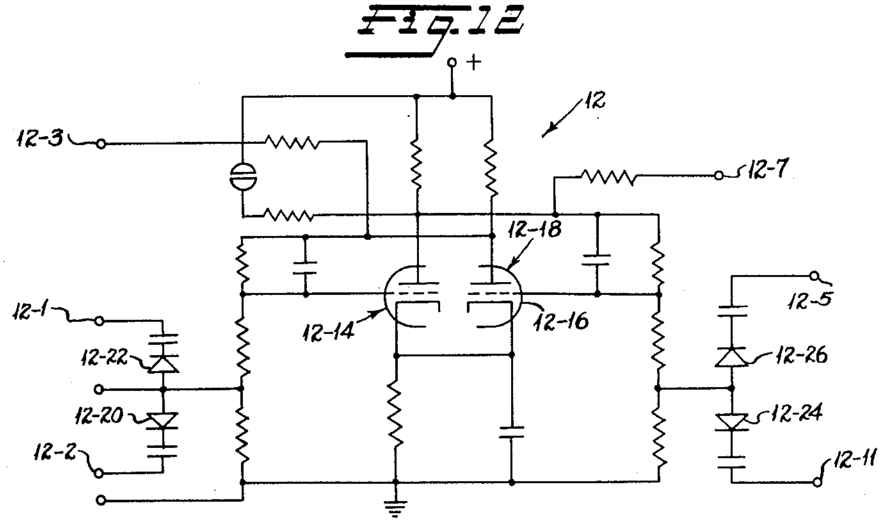
Figure 12 is a schematic circuit diagram of a double stability multivibrator or flip flop circuit.

The block diagram, Figure 7, is employed to facilitate the tracing of the steps in the operation of the means which provide the impulses to produce movement of the drum 14 and of the light gun 16, and control the disposition of the signal produced as the photo cell 56 swings from black to white, and vice versa.

The block diagram (Figure 7) is supplemented by Figures 8 to 17 illustrating the circuits represented by each block in Figure 7. To simplify the presentation when two or more blocks in Figure 7 represent identical circuits, the details of those circuits have been illustrated but once in Figures 8 to 17. To facilitate reference between the block diagram and the detailed circuits, each block in Figure 7 is identified by a numeral corresponding to the figure number of the drawing illustrating its detail and identical circuit representing blocks in Figure 7 are distinguished by an appended letter designation. For example, blocks 10*a* and 10*b* both represent identical circuits, the details of either of which are shown in Figure 10. Individual parts of those circuits are identified by hyphenated numerals identifying the figure in which they are shown and, in Figure 7, the particular individual component circuit. For example: terminal 10–1 in Figure 10 corresponds to terminal 10*a*–1 of component circuit 10*a* or to terminal 10*b*–1 of component circuit 10*b* in Figure 7.

Figure 7 illustrates in block diagram form the circuitry for controlling the movement of the light gun 16 and drum 14 in the manner just described and for controlling the generation of signals indicative of the functional relation of the two variables, expressed by the curve being followed.

For this purpose during automatic operation, the output signal of a source of a train of equally spaced impulses is divided first into two channels, one operative to produce *dx* movement of the drum 14 and the other operative to produce *dy* movement of the light gun 16. The impulses in the *dy* channel are further separated into two channels to produce plus *dy* and minus *dy* movement of the light gun. The source of impulses is a free running multivibrator 11. The pulses from multivibrator 11 are channeled as *dx* or *dy* impulses by a dual gate 10*b*, *dx* impulses appearing at output terminals 10*b*–3 and *dy* impulses at output terminal 10*b*–7. The *dy* impulses are further channelized as plus *dy* or minus *dy* impulses by dual gate 10*a*, plus *dy* impulses appearing at output terminal 10*a*–3 and minus *dy* impulses appearing at output terminal 10*a*–7.

The operation of gate 10*a* is controlled by a Schmidt trigger the condition of which is directly related to the focusing of the light gun's light beam on a dark or light area. The operation of gate 10*b* is controlled by a flip flop 12 the conductive condition of which is controlled by a change in the position of focus of the light gun light beam between areas of dark and light and by signals indicative of the completion of a unitary step in the X direction.

The following detailed explanation of the circuitry involved will clarify the foregoing general explanation.

Photocell amplifier 8 (Figure 8) is a D. C. amplifier of conventional form. The photocell 56 is connected through input terminals 8–2 and 8–3 to the amplifier 8. As connected, when the photocell 56 is illuminated, the potential on terminal 8–3 is high and, when the photocell is not illuminated, the potential on terminal 8–3 is low.

The D. C. signal at input terminal 8–3 is reflected in amplified form at the output terminal 8–7. When the photocell is illuminated, the potential at output terminal 8–7 is low and when the photocell is dark, the potential at 8–7 is high. Output terminal 8–7 of amplifier 8 is coupled directly to the input terminal 9–2 of a conventional Schmidt trigger circuit 9. So long as the photocell is illuminated, the low potential appearing at input terminal 9–2 of trigger 9 will maintain the left hand half 9–11 of the dual triode tube 9–10 cut off and the right hand half 9–12 conducting. The reverse conducting condition of tube 9–10 exists when the photocell 56 is dark.

Output terminals 9–5 and 9–9 of trigger circuit 9 are each connected through 1 megohm resistors to the anodes of the left and right hand halves tube 9–10 respectively. Thus so long as the photocell 56 is illuminated, a high D. C. potential will be present at output terminal 9–9 and a low D. C. potential present at output terminal 9–5. So long as the photocell 56 is dark a low D. C. potential will be present at terminal 9–9 and a high D. C. potential present at terminal 9–5.

Terminals 9–5 and 9–9 of trigger 9 are directly connected to the input terminals 10*a*–2 and 10*a*–1, respectively of a dual gate circuit 10*a* (Figure 10), which are in turn connected directly to the suppressor grids of the pentode tubes 10*a*–10 and 10*a*–12, respectively, of this dual gate.

During the periods when *dy* pulses are being transmitted in a manner which will be described hereinafter, a series of pulses at the rate of 20 pulses per second are applied by A. C. coupling to the control grids of both tubes 10*a*–10 and 10*a*–12 of dual gate 10*a*. Whether these pulses are transmitted through tube 10*a*–10 or tube 10*a*–12 depends on whether terminal 10*a*–1 or terminal 10*a*–2 is at a high potential. Thus, so long as the photocell is illuminated and a high potential on terminal 10*a*–1 maintained, any impulses applied to terminal 10*a*–9 of dual gate 10*a* will appear at the output terminal 10*a*–7 of gate 10*a*. As will appear later, these pulses will cause advancement of the light gun and the photocell 56 thereof in a minus *dy* direction (to the left in Figure 6) until illumination of the photocell is terminated as a result of the light beam being focused on the dark line of the curve being followed. Input terminal 10*a*–2 being at a low potential, no impulses will be transmitted to output terminal 10*a*–3.

When the photocell is dark as a result of the light beam being focused on the dark line of the curve being followed, and input terminal 10*a*–2 is at a high potential, any *dy* impulses applied to terminals 10*a*–5 and 10*a*–9 of gate 10*a* will appear at output terminal 10*a*–3 and not at output terminal 10*a*–7. Impulses at output terminal 10*a*–3 of gate 10*a* will effect advancement of the light gun in a plus *dy* direction until the photocell 56 is again illuminated.

The impulses hereinbefore referred to are generated by free running multivibrator 11 (Figure 11). The output signal of this multivibrator is a series of square waves at a frequency of approximately twenty pulses per second. The limiting factor on the frequency of this multivibrator is that its frequency must not be higher than the maximum rate of response of the ratchet drive magnets 24, 28, 34 and 38.

The output signal of this multivibrator 11 is capacitively coupled to the control grid terminals 10*b*–5 and 10*b*–9 of a dual gate 10*b*, the detailed circuitry of which is illustrated in Figure 10. The purpose of gate 10*b* is to alternatively transmit impulses which will effect relative movement between the curve and light gun in the *dx* or *dy* directions. This gate 10*b* consists of a pair of pentodes 10*b*–10 and 10*b*–12 which are rendered operative alternatively by the application of a high potential to the suppressor grid of one and the simultaneous application of a low potential to the suppressor grid of the other. When the tube 10*b*–10 of this gate 10*b* is rendered conductive in this manner, impulses appear at its anode which are utilized to effect *dx* advancement of the light gun 16 relative to the curve being followed. When the tube 10*b*–12 of gate 10*b* is conductive, impulses appear at output terminal 10*b*–7 of gate 10*b* which are transmitted to input terminals 10*a*–5 and 10*a*–9 of gate 10*a* as hereinbefore described. These pulses, depending on the setting of gate 10*a* are used to effect plus *dy* or minus *dy* advancement of the light gun relative to the curve being followed.

The alternative operation of gate 10*b* is controlled by a flip flop 12, the suppressor grid input terminals 10*b*–2 and 10*b*–1, of gate 10*b* being connected directly to output terminals 12–3 and 12–7, respectively of flip flop 12 which are, in turn, each connected through one megohm resistor to the anodes of the right and left hand halves 12–14 and 12–16 of the dual triode 12–18 of flip flop 12.

By this arrangement, so long as the right hand half 12–16 of the tube 12–18 is cut off, its anode will be at a high potential and this potential will be applied through terminals 12–3 and 10*b*–2 to the suppressor grid of the tube 10*b*–10 of gate 10*b* so that *dx* impulses may be transmitted. At this time, the anode of the left hand half 12–14 of tube 12–18, which is conducting, is at a low potential. This low potential is applied through terminals 12–7 and 10*b*–1 to the suppressor grid of the tube 10*b*–12 of gate 10*b* to cut that tube off and prevent transmission of *dy* impulses.

Flip flop 12 is provided at its input terminals with clamping diodes 12–20, 12–22, 12–24, and 12–26 so that it is responsive to negative impulses only.

Flip flop 12 receives at its input terminals 12–5 or 12–11 a negative impulse each time trigger 9 changes its conditions of conductivity in response to a change of the state of the photocell from illumination to darkness of vice versa.

If, upon the reception of such an impulse at terminal 12–5 or 12–11 the right hand half 12–16 of the tube 12–18 is conducting to, through its control of gate 10*b*, permit transmission of *dy* impulses to gate 10*a* flip flop 12 will reverse its state to permit transmission of *dx* impulses through gate 10*b*. If, when such an impulse is received at terminal 12–5 or 12–11 of flip flop 12, the right hand half 12–16 of the tube 12–18 is cut off, the applied negative impulse will have no effect upon flip flop 12 and the left tube 10*b*–10 of gate 10*b* will remain conductive to transmit *dx* impulses from multivibrator 11.

The reversal of flip flop 12 from a state in which its left hand half 12–14 is conducting to a state in which its right hand half 12–16 is conducting is effected by the application of a negative impulse to either terminal 12–1 or 12–2 of flip flop 12. Such an impulse, which effects termination of the transmission of *dx* impulses by gate **10*b*** is received in a manner and at a time hereinafter described.

As previously indicated, when the left hand tube **10*b*–10 of gate 10*b* is rendered conductive under control of flip flop 12 when its right half 12–16 is turned off in response to a negative impulse at its terminals 12–5 or 12–11 indicating a change of the illumination of the photocell from dark to illumination or vice versa, an impulse appears at the output terminal 10*b*–3 of gate 10*b* of the switch 100**. When this switch is in its plus position this *dx* signal is transmitted to the input terminal **13*c*–11** of the plus *dx* relay driver circuit **13*c***. When this switch is in the minus position, this *dx* signal is transmitted to the input terminal **13*d*–11** of the minus *dx* relay driver circuit **13*d***.

The plus *dx* one shot relay driver **13*c*** controls the application of impulses to actuate the plus *dx* drive motor 28 to effect relative movement between the light gun and the curve being followed in a plus *dx* direction while the minus *dx* one shot relay driver **13*d*** controls the application of impulses to actuate the minus *dx* drive motor 24 to effect relative movement between the light gun and the curve being followed in a minus *dx* direction.

Figure 13:
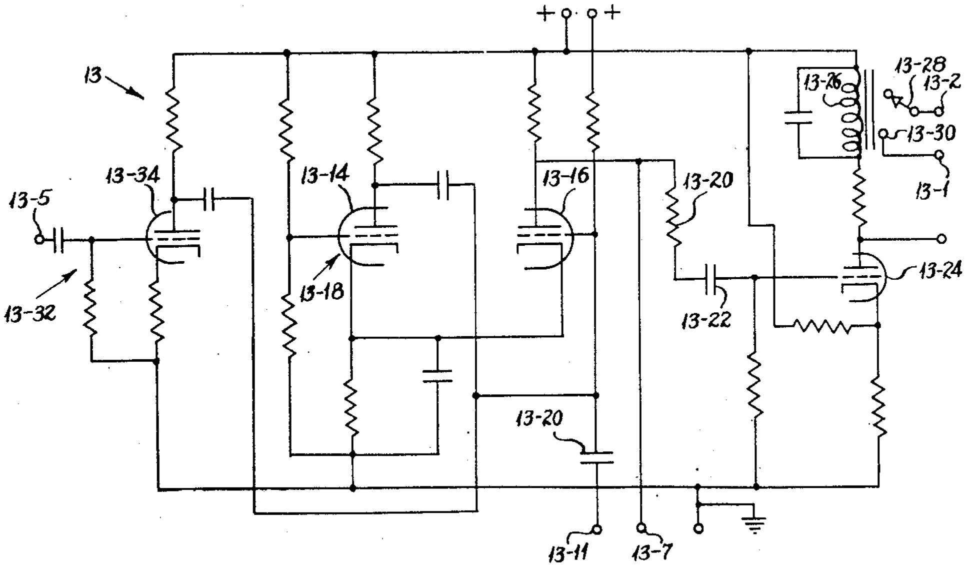
Figure 13 is the schematic circuit diagram of a combined one-shot and relay driver circuit.
Figure 14:
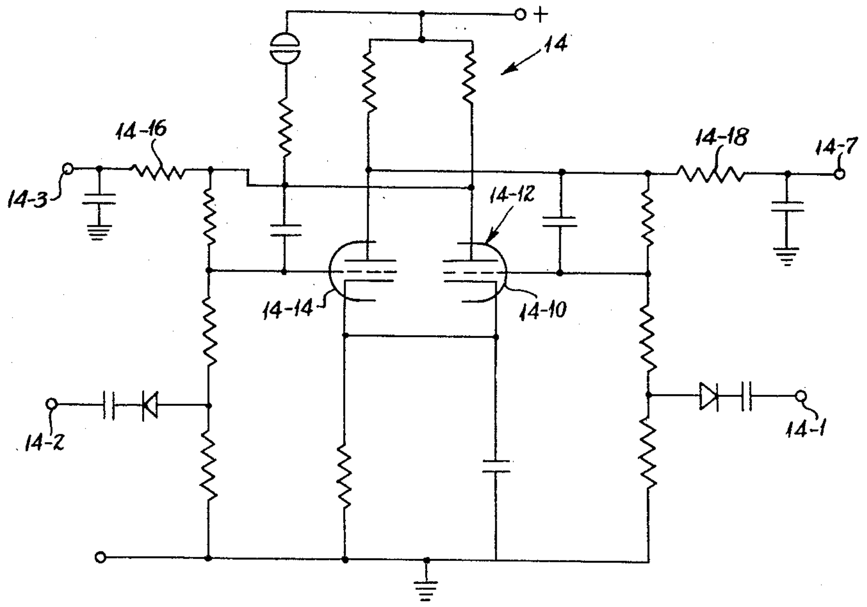
Figure 14 is the schematic circuit diagram for a modified form of double stability multivibrator or flip flop circuit.
Figure 15:
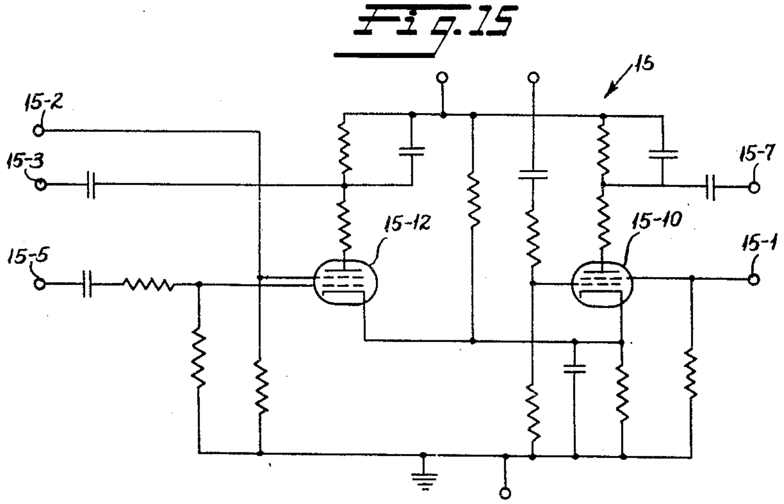
Figure 15 is a schematic circuit diagram of an output gate circuit.
Figure 16:
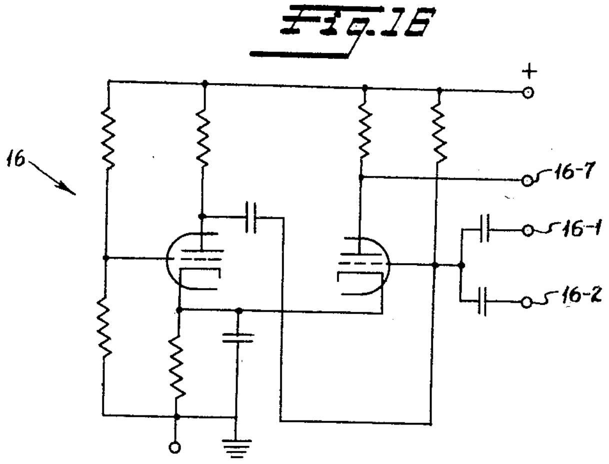
Figure 16 is a circuit diagram of a single stability multivibrator or one shot used as a part of an error alarm circuit.
Figure 17:
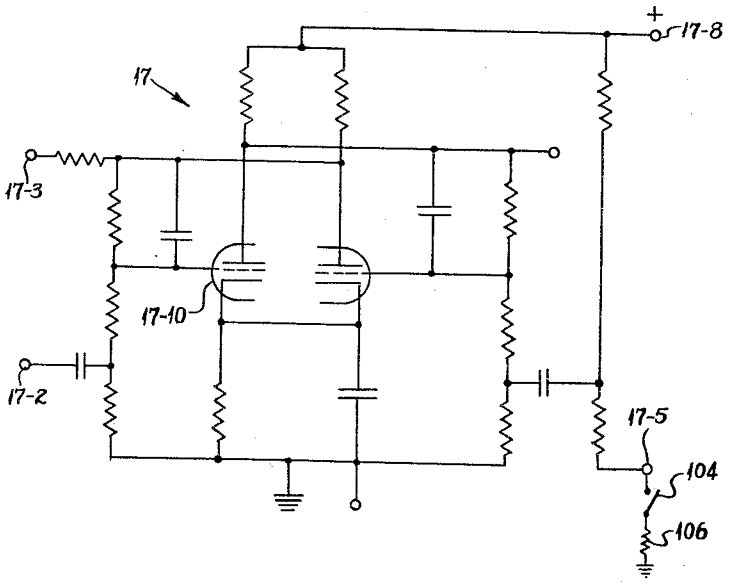
Figure 17 is a circuit diagram of a modified form of double stability multivibrator or flip flop used in the alarm circuit.

Since the minus *dx* and plus *dx* one shot relay drivers **13*c* and 13*d*** are identical, a detailed description of the operation of the minus *dx* one shot relay driver **13*d*** in reference to the detailed circuitry shown in Figure 13 will suffice for both.

In minus *dx* one shot relay driver **13*d*, the two halves 13*d*–14 and 13*d*–16 of the dual triode 13*d*–18 are coupled to form a single shot multivibrator, the left hand half 13*d*–14 of which is normally cut off and the right hand half 13*d*–16** of which is normally conducting. The *dx* pulse received at input terminal **13*d*–11 of the one shot relay driver 13*d* is a negative impulse which is applied through a capacitor 13*d*–20 to the grid of tube half 13*d*–16 and is effective to cut off the tube half 13*d*–16 of the trigger tube 13*d*–18 and render the left half 13*d*–14** conductive. The time constant of circuit is such that this condition will be maintained for from 20 to 25 milliseconds to allow the *dx* drive motor magnet 24 controlled thereby sufficient time to energize.

When the right half **13*d*–16 of the trigger tube 13*d*–18 is cut off, a positive impulse is transmitted through resistor 13*d*–20 and capacitor 13*d*–22 to the grid of the extreme right hand tube half 13*d*–24 of the one shot driver 13*d*. This positive impulse of 20 to 25 milliseconds' duration renders this tube half 13*d*–24 conductive to energize the relay coil 13*d*–26 in its plate circuit. When the anode of the tube half 13*d*–16 of the trigger tube 13*d*–18 went positive, a positive signal was fed via output terminal 13*d*–7 to input terminal 12–2 of the flip flop 12 but, due to the clamping action of the diode 12–20 at input terminal 12–2, this impulse is ineffective to modify the condition of flip flop 12 which at this time is conducting through its left hand half 12–14**.

The energization of the relay coil **13*d*–26 of relay driver 13*d* closes contacts 13*d*–28 and 13*d*–30 to connect together terminals 13*d*–1 and 13*d*–2 of the relay driver 13*d***. This is effective to energize the minus *dx* drive motor magnet 24 by grounding one end thereof while its opposite end is connected to a source of D. C. potential to thereby produce relative movement between the light gun and the curve being followed one step in the minus *dx* direction by rotating the drum 14 in a clockwise direction as viewed in Figure 3.

At the end of the 20 to 25 millisecond shift in mode of conduction of the single shot trigger tube **13*d*–18 of the one shot relay driver 13*d*, the trigger tube 13*d*–18 will return to its normal condition in which its right half 13*d*–16 is cut off. Restoration of the trigger to this condition will shut off the extreme tube half 13*d*–24 by applying a negative impulse to the control grid thereof and, in addition, will transmit a negative impulse via output terminal 13*d*–7 to the input terminal 12–2 of the flip flop 12. This negative impulse will cut off the left half 12–14 of flip flop 12 and render its right half 12–16 conductive. This will shift dual gate 10*b*** to a condition to feed *dy* pulses from its output terminal **10*b*–7** and not to feed *dx* pulses from its output terminal **10*b*–3**.

The operation and circuitry of the plus *dx* one shot relay driver **13*c*** is identical to that just described for the minus *dx* one shot relay driver **13*d* and will be operative by connecting contacts 13*c*–28 and 13*c*–30 to energize magnet 28 and thereby control relative movement between the light gun 16** and the curve being followed in the plus *dx* direction when the switch 100 is in the plus position.

In addition, the switch 100 has a further position in which the connection between output terminal **10*b*–2** for the *dx* gate tube **10*b*–10 of gate 10*b* and the input terminals 13*c*–11 and 13*d*–11** of the plus *dx* and minus *dx* drivers **13*c* and 13*d*** are open. In such instance, the *dx* relative movement between the light gun 16 and the sheet 12 of the curve 15 being followed is under control of a coupled computer 102 such as one of the digital differential analyzers of which those developed by Northrup Aircraft and known by the name Maddida are typical examples.

When the *dx* movement is under control of computer 102 of that type, a negative square wave pulse is fed from the computer 102 to terminal **13*d*–5** of the minus *dx* one shot relay driver **13*d*** for minus *dx* movement and a negative square wave impulse fed from the computer 102 to terminal **13*c*–5** of the plus *dx* one shot relay driver **13*c*** for plus *dx* movement. It will suffice to explain the operation of the minus *dx* one shot relay driver **13*d* under the effect of negative square wave impulse to its input terminal 13*d*–5**.

Terminal **13*d*–5 (Figure 13) is connected through a C–R differentiating circuit 13*d*–32 to the control grid of the extreme left hand tube half 13*d*–34** of the minus *dx* one shot relay driver circuit. The positive impulse portion of the signal resulting from this differentiation of the applied negative square wave produces a negative impulse at the anode of this tube half **13*d*–34 which is capacitively coupled to the control grid of the right hand tube half 13*d*–16 of the single shot trigger tube 13*d*–18 of this relay driver circuit to effect energization of the relay coil 13*d*–26 and feed back of a negative signal to the flip flop 12** in the same manner as described hereinbefore.

The plus *dy* and minus *dy* one shot relay drivers **13*b* and 13*a*** are identical in operation and structure with the plus *dx* and minus *dx* drivers **13*c* and 13*d* with the exception that the output terminals 13*b*–7 and 13*a*–7** of the plus *dy* and minus *dy* one shot relay drivers **13*b* and 13*a* are connected to feed impulses to the coupled computer 102**.

Dependent upon the characteristics of the computer 102, it may be necessary to feed the output *dy* impulses from terminals **13*a*–7 and 13*b*–7 to the computer 102** through a "zero-one" filter. Such a filter, which is included in the exemplary embodiment of the present invention for purposes of completeness, is operative to suppress the first *dy* impulse to succeed a *dy* pulse of the opposite sign. In so doing the number of *dy* impulses transmitted will directly indicate the actual change of Y. Thus, if the change of Y is zero, there will be no *dy* output signal when the "zero-one" filter is used. Without such a filter, if the actual change of Y is zero, the output signal will indicate alternate plus and minus *dy* changes.

Assuming, for example, that the last *dy* pulse was a minus *dy* pulse applied to terminal 14–1. Under these conditions, the right half 14–10 of the tube 14–12 of flip flop 14 (Figure 14) is cut off and the left half 14–14 is conductive. Output terminal 14–7 of flip flop 14 is therefore at a low potential and output terminal 14–3 is at a high potential. Output terminals 14–3 and 14–7 are connected respectively through input terminals 15–1 and 15–2 to the suppressor grids of the right and left hand tubes 15–10 and 15–12 of the dual and gate 15. One megohm resistors 14–16 and 14–18 are interposed between the anodes of the flip flop 14 and the suppressor grids of the corresponding tubes 15–10 and 15–12 of the dual and gate 15 to delay the shift of control on the gate tubes 15–10 and 15–12 until after termination of the pulse which shifts the flip flop 14 to thereby prevent transmission by the gate tubes 15–10 and 15–12 of a portion of that flip flop shifting pulse.

Under the above assumed conditions, if the next output impulse is a pulse from the plus *dy* one shot driver output terminal 13*b*–7, this pulse will be applied to terminal 14–2 of the flip flop 14 and terminal 15–5 of the gate 15. Since terminal 15–5 is connected to the control grid of the left hand gate tube 15–12 which is cut off by the low potential on its suppressor grid, this pulse has no effect on the gate output. This pulse applied to terminal 14–2 of the flip flop 14 reverses the conductive state of the flip flop 14 and, after the time delay as defined by the one megohm resistors 14–16 and 14–18 turns on the left gate tube 15–12 and cuts off the right gate tube 15–10. All immediately succeeding plus *dy* impulses are fed to the computer 102 through the left hand gate tube 15–12 and output terminal 15–3 but have no effect on the flip flop 14.

When the plus *dy* pulses are interrupted and a minus *dy* impulse received from terminal 13*a*–7, the reverse of the foregoing operation occurs.

When the *dx* advancement is under control of computer 102, it is possible that a plus or minus *dx* signal would be received from the computer 102 before the follower has had an opportunity to complete a previously initiated *dy* movement. If this occurs, error in the computation will result. To detect such an error, an error alarm circuit is provided to terminate operation of the follower until normal operation has been manually restored.

The error alarm circuit includes a dual and gate 10*c*, the suppressor grids of each tube 10*c*–10 and 10*c*–12 of which are connected through terminals 10*c*–2, 10*c*–1 and 12–7 to the anode of the left hand tube of the flip flop 12 in parallel with the suppressor grid of the right hand or *dy* tube of dual gate 10*b*. Thus, so long as the circuit is conditioned to transmit *dy* impulses, both tubes of dual gate 10*c* will be conductive. The control grid of the right hand tube 10*c*–12 of gate 10*c* is connected through terminal 10*c*–9 to output terminal 13*d*–7 of the minus *dx* one shot relay driver 13*d* while the control grid of the left hand tube 10*c*–10 of gate 10*c* is connected through terminal 10*c*–5 to output terminal 13*c*–7 of the plus *dx* one shot relay driver 13*c*. The output terminals 10*c*–3 and 10*c*–7 of gate 10*c* are capacitively coupled in parallel to a single shot multivibrator 16 through input terminals 16–1 and 16–2, respectively. The output terminal 16–7 of one shot 16 is in turn capacitively coupled through input terminal 17–2 of the left hand tube half 17–10 of double stability multivibrator 17.

Thus, whenever either the plus or minus *dx* one shot relay drivers 13*c* or 13*d* is actuated while the flip flop 12 is set to permit *dy* pulse transmission, an impulse will be fed to trigger error one shot 16 which, in turn feeds an impulse to flip flop 17 to shift this flip flop 17 from its normal to its error condition. This flip flop 17 is restored by actuation of a reset switch 104 which grounds terminal 17–5 through a small resistor 106. When the error flip flop 17 turns to its error condition, a neon lamp 108 is lighted via a circuit through terminal 17–3.

While the expressions X and Y, *dx* and *dy* have been used in the foregoing description and the claims appended hereto, it is to be understood that these expressions are merely a succinct expression of the concept of any two functionally related variables depicted upon rectangular coordinates and that it is not intended that such expressions shall have any more limited meaning.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a device for producing a train of impulses indicative in number of the change in one variable corresponding to a predetermined change of a second variable bearing a continuous functional relationship to such first variable, a source of electrical impulses, an electronic gate circuit connected to said impulse source, means adapted to be controlled by a curve expressing in rectangular coordinates the functional relationship between two continuously functionally related variables for rendering said gate operative to transmit impulses from said source in groups each indicative in number to the change of one variable corersponding to a given one of a series of unitary changes in the other variable, a pair of electronic gate circuits connected in common to the output of the first said electronic gate circuit, and means for rendering said pair of gate circuits operative alternatively to transmit the impulses from the first said gate circuit in accordance with the sense of the change of said one variable.

2. A computing device operative under control of a display of a curve expressing a functional relationship between two variables, said device comprising, a light responsive cell and associated light source, a member movable in a first direction, means for moving said member in unit steps in such direction, means for moving said cell and light source in unit steps in a direction normal to the direction of movement of said member in coordination with movement of said member, means to transmit electrical pulses indicative of movement of said member, and means to transmit electrical impulses indicative of movement of said cell and light source.

3. A computing device operative under control of a display of a curve expressing a functional relationship between two variables, said device comprising a member adapted to carry thereon in a predetermined orientation a display of a curve expressing in rectangular coordinates a functional relation between two variables, means for moving said member in unit steps in the direction of one axis of such curve, a radiation responsive cell and associated light source, means for moving said cell in unit steps in the direction of an axis of said curve perpendicular to said one axis, in coordination with movement of said member, means to transmit electrical impulses indicative of stepped movement of said member, and means to transmit electrical impulses indicative of stepped movement of said cell and associated light source.

4. A computing device operative under control of a display of a curve expressing a functional relationship between two variables, said device comprising a first member adapted to carry in a predetermined orientation thereon a curve expressing in rectangular coordinates a functional relation between two variables, means for moving said first member in unit steps in the direction of one axis of said curve, means to indicate the slope of said curve at each such unit step of said first member, said means comprising a second member, means for moving said second member in unit steps in the direction of the other axis of a curve, and means cooperable with said second member to transmit discrete electrical impulses indicative of the stepped movement of said second member.

5. A computing device operative under control of a display of a curve expressing a functional relationship between two variables, said device comprising a first member movable in a first direction, means to effect movement of said member in unit steps in such direction, a second member movable in a second direction normal to said first, means to effect movement of said second member in unit steps in such second direction in coordination with movement of said first member, a load circuit, and means for transmitting discrete electrical impulses to said load circuit indicative of stepped movement of said second member.

6. A computing device operative under control of a display of a curve expressing functional relationship between two variables, said device comprising a first member movable in a first direction, a first source of electrical impulses, means connecting said first source to effect movement of said first member in unit steps in such first direction, a second member movable in a second direction normal to said first, means connecting said first source to effect movement of said second member in unit steps in such second direction, a second source of electrical impulses connected in circuit association with said first source to effect movement of said first member in coordination with movement of said second member, a load circuit, and means to transmit discrete electrical impulses to said load circuit indicative of stepped movement of said second member.

7. A computing device operative under control of a display of a curve expressing a functional relationship between two variables, said device comprising a first movable member, a first means for driving said first member in small steps in a first direction, a second movable member carrying a radiation responsive cell and a light source, a second means for driving said second member in small steps in a second direction normal to said first direction, said first member having areas cooperable with said light source to absorb light and to reflect light respectively, a source of electrical driving impulses, and means responsive to light reflected from said first member to said cell to control selective switching of said driving impulses to said first driving means and to said second driving means, respectively.

8. A computing device operative under control of a display of a curve expressing a functional relationship between two variables, said device comprising a first member movable in first direction, a first source of electrical impulses, means connecting said first source of pulses to effect movement of said first member in unit steps in said first direction, a second member movable in a second direction normal to said first direction, means connecting said second member with said first source of electrical impulses to effect movement of said second member in unit steps in said second direction in timed relation to the movement of said first member, a second source of electrical pulses connected in circuit association with said first source to effect movement of said first member in coordination with said second member, and means to render said second source ineffective in the event of lack of coordination between pulses from said second source and movement of said second member.

9. In a device for producing a train of impulses indicative in number of the change in one variable corresponding to a predetermined change of a second variable bearing a continuous functional relationship to such first variable, a source of electrical impulses, a first electronic gate circuit connected to said impulse source, a pair of electronic gate circuits the inputs of which are connected in common to the output of said first electronic gate circuit, a pair of devices mounted for relative movement in each of two mutually perpendicular directions, one of said relatively movable devices being adapted to carry a display of a curve expressing in rectangular coordinates the functional relationship between two continuously functionally related variables and the other of said relatively removable devices being adapted to distinguish between a condition in which it bears a predetermined aligned relationship to such a curve and a condition when it is misaligned from such predetermined aligned position relative to such a curve, means for imparting relative movement of said relatively movable devices in one of said directions in unit increments, means for imparting relative movement to said relatively movable devices in the second of said directions after each such unit increment in said one direction in discrete increments indicative in number of the change of one variable of such a curve corresponding to a given unitary change in the other variable of such a curve, a first circuit device controlled by said other of said relatively movable devices and coupled to said pair of electronic gate circuits for rendering said pair of gate circuits operative alternatively dependent upon the condition of alignment of said other of said relatively movable devices to such a curve, a second circuit device responsive to each change in the operation of said first circuit device for rendering said first gate circuit inoperative, and means operative after each unit increment of relative movement between said relatively movable devices in said one direction for restoring said first gate circuit to its operative condition.

10. A device for producing a train of impulses indicative in number of the change of one variable corresponding to a predetermined change of a second variable bearing a continuous functional relationship to such first variable, said device comprising a carrier adapted to mount a display of a curve expressing in rectangular coordinates the functional relationship between two such variables, a photo-cell and associated light source mounted adjacent said carrier, means mounting said carrier and said associated photo-cell and light source for relative movement in each of two mutually perpendicular directions, said associated photo-cell and light source being adapted to produce a first signal when the light from said source is focused upon the curve of such a display mounted on said carrier and a second signal when the light from said source is focused upon a point on such a display adjacent such a curve, a first circuit device controlled by said photo-cell operative to produce a first signal during the duration of the first signal from said photo-cell and a second signal during the duration of such second signal from said photo-cell, a double stability circuit device connected to said first circuit device and operative to shift from a first condition of stability to a second condition of stability when in said first operative condition upon each change in output signal from said first circuit device, a source of a train of electrical impulses, a first pair of electronic gate circuits controlled for alternative operation in accordance with the condition of said double stability circuit device and connected in common to the output of said impulse source whereby one electronic gate of said pair is operative to transmit impulses from said source so long as said double stability circuit device is in one of said conditions of stability and the other electronic gate of said pair is operative to transmit impulses from said impulse source so long as said double stability circuit device is in its other condition of stability, means operative while said double stability circuit device is in said second condition of stability for imparting relative movement between said carrier and said associated photo-cell and light source in said one direction a unitary increment and for transmitting an impulse to said double stability circuit device to reverse its condition of stability from said second condition to said first condition, a second pair of electronic gate circuits controlled for alternative operation by the alternative output signals of said first circuit device and connected in common to the output of the electronic gate circuit of said first pair which is effective while said double stability circuit device is in said first condition of stability, means coupled to the output of one gate of said second pair of electronic gates for imparting relative movmeent between said carrier and said associated photo-cell and light source in the other of said directions in one sense, and means responsive to each output signal of the other electronic gate circuit of said second pair of electronic gate circuits for imparting relative movement between said associated photo-cell and light source and said carrier in said other direction in the opposite sense.

11. A device for producing a series of pulses corresponding in number to the change in a first variable occasioned by a change in a second variable, said first and second variable having a continuous functional relationship, said device including: follower means adapted for movement relative to a curve expressing in graphical form the functional relationship between said first and second variable; a first pulsed driving means, operable to cause relative movement of said follower means in a series of step-by-step movements in a first direction; a second pulsed driving means operable to cause relative movement of said follower means in a series of step-by-step movements in a second direction substantially perpendicular to said first direction; and control means connected to said first and second driving means and operable to cause relative movement of said follower means and said curve corresponding to a single step in said first direction and then the necessary number of steps in second direction to bring said follower means into substantial alignment with said curve, said second driving means moving said follower means in said second direction and proving a pulse signal for each of said steps in said second direction.

12. A device for producing a series of pulses corresponding in number to the change in a first variable occasioned by a change in a second variable, said first and second variables having a continuous functional relationship, said device including: follower means adapted to be moved relative to a curve expressing in graphical form the functional relationship between said first and second variables; driving means operable to move said follower means relative to said curve in a series of step-by-step movements in a first direction; a second driving means operable to move said follower means relative to said curve in a series of step-by-step movements in a second direction substantially perpendicular to said first direction; response means connected to said follower means and operable to indicate the alignment or non-alignment of said follower means with said curve; a source of pulses; control means connecting said source of pulses to said second driving means to provide a relative movement of said follower means in said second direction; and another control means connecting said source of pulses to said first driving means to provide a series of step-by-step relative movements of said follower means in said first direction, whereby said follower means is maintained in alignment with said curve.

13. A device for producing a series of pulses corresponding in number to the change in a first variable occasioned by a change in a second variable, said first and second variables having a continuous functional relationship, said device including: follower means adapted to be moved in a first direction to follow a curve expressing in graphical form the functional relationship between said first and second variable; supporting means adapted to receive said curve, said supporting means being movable in a second direction substantially perpendicular to said first direction, said follower means and said supporting means being cooperatively positioned adjacent each other and said first and second direction of movement being relative between said follower and said supporting means; a first pulsed driving means connected to said supporting means and operable to move said supporting means in a series of step-by-step movements in said first relative direction; a second pulsed driving means connected to said follower means and operable to move said follower means in a series of step-by-step movements in said second relative direction; and control means connected to said first and second driving means and operable to cause relative movement of said supporting means corresponding to a single step in said first direction, and then cause relative movement of said follower means corresponding to the necessary number of steps in said second direction to bring said follower means into substantially alignment with said curve, said second driving means providing a pulse signal for each of said steps in said second direction.

14. A device for producing a series of pulses corresponding in number to the change in a first variable occasioned by a change in a second variable, said first and second variables having a continuous functional relationship, said device including: follower means adapted to be moved in a first direction to follow a curve expressing in graphical form the functional relationship between said first and second variable; supporting means adapted to receive said curve, said supporting means being movable in a second direction substantially perpendicular to said first direction, said follower means and said supporting means being cooperatively positioned adjacent each other and said first and second directions of movement being relative between said follower and said supporting means; a first driving means connected to said supporting means and operable to move said supporting means in a series of step-by-step movements in said first relative direction; a second driving means connected to said follower means and operable to move said follower means in a series of step-by-step movements in said second relative direction; response means connected to said follower means and operable to indicate the alignment or non-alignment of said follower means with said curve; a source of pulses; a first control means connecting said source of pulses to said first driving means to provide movement of said support means in said first relative direction; and a second control means connecting said source of pulses to said second driving means to provide step-by-step movement of said follower means in said second relative direction, whereby said follower means is maintained in alignment with said curve, said second control means providing a pulse signal for each of said steps in said second direction.

15. A device for producing a series of pulses corresponding in number to the change in a first variable occasioned by a change in a second variable, said first and second variables having a continuous functional relationship that is expressed in graphical form, said device including: supporting means adapted to receive said graphical representation of said functional relationship; follower means adjacent said supporting means and adapted to scan said graphical representation, said follower means being responsive to physical differences between the curve comprising said graphical representation and the material said curve is on; a first driving means operative to move said supporting means with respect to said follower means in a step-by-step manner in a first direction; a second driving means operative to move said follower means with respect to said supporting means in a step-by-step manner in a second direction substantially perpendicular to said first direction; and control means connected to said follower means and said first and second driving means and operative to cause a single operation of said first driving means and then the necessary number of operations of said second driving means to cause a change in the output of said follower means, said change being indicative of the physical differences between said curve and said material, whereby said follower means follows the edge of said curve, said control means providing a pulse output signal for each of said step-by-step movements.

References Cited in the file of this patent

UNITED STATES PATENTS 2,617,587 Carpenter ------------- Nov. 11, 1952

U. S. DEPARTMENT OF COMMERCE

PATENT OFFICE

CERTIFICATE OF CORRECTION

Patent No. 2,816,705 December 17, 1957

Lewis L. Thrall et al.

It is hereby certified that error appears in the printed specification of the above numbered patent requiring correction and that the said Letters Patent should read as corrected below.

Column 13, line 24, for "proving" read --providing--; column 14, lines 4 and 5, for "substantially" read --substantial--.

Signed and sealed this 25th day of March 1958.

(SEAL)
Attest:

KARL H. AXLINE

Attesting Officer

ROBERT C. WATSON
Commissioner of Patents